US012025543B1

(12) United States Patent
Zhang et al.

(10) Patent No.: US 12,025,543 B1
(45) Date of Patent: Jul. 2, 2024

(54) BLOOD SAMPLE PLATELET UNIFORM-MIXING DEVICE FOR BLOOD ANALYZER

(71) Applicants: Sichuan Academy of Medical Sciences • Sichuan Provincial People's Hospital, Sichuan (CN); CHENGDU MEDICAL COLLEGE, Sichuan (CN)

(72) Inventors: Juan Zhang, Sichuan (CN); Dan Li, Sichuan (CN); Xiaotian Huang, Sichuan (CN); Taiqiang Zhao, Sichuan (CN); Yang Su, Sichuan (CN); Zhigang Xiong, Sichuan (CN)

(73) Assignees: Sichuan Academy of Medical Sciences. Sichuan Provincial People's Hospital, Sichuan (CN); CHENGDU MEDICAL COLLEGE, Sichuan (CN)

( * ) Notice: Subject to any disclaimer, the term of this patent is extended or adjusted under 35 U.S.C. 154(b) by 0 days.

(21) Appl. No.: 18/466,695

(22) Filed: Sep. 13, 2023

(30) Foreign Application Priority Data

Mar. 9, 2023 (CN) .......................... 202310221185.8

(51) Int. Cl.
| | | |
|---|---|---|
| B01F 31/50 | (2022.01) | |
| B01F 31/20 | (2022.01) | |
| B01F 31/23 | (2022.01) | |
| G01N 1/38 | (2006.01) | |
| B01F 101/23 | (2022.01) | |

(52) U.S. Cl.
CPC ............. *G01N 1/38* (2013.01); *B01F 31/201* (2022.01); *B01F 31/23* (2022.01); *B01F 31/50* (2022.01); *B01F 2101/23* (2022.01)

(58) Field of Classification Search
CPC ......... G01N 1/38; B01F 31/201; B01F 31/23; B01F 31/50; B01F 2101/23
USPC .............. 73/863, 53.01, 61.71–61.75, 64.56, 73/863.21; 422/68.1, 500, 548, 560–562; 366/140, 108, 111, 180.1, 200, 217
See application file for complete search history.

(56) References Cited

FOREIGN PATENT DOCUMENTS

| CN | 208512432 U | 2/2019 |
|---|---|---|
| CN | 212040180 U | 12/2020 |
| CN | 214681340 U | 11/2021 |

(Continued)

OTHER PUBLICATIONS

Search Report for China Application No. 2023102211858.
Notice to Grant for China Application No. 2023102211858, mailed Apr. 19, 2023.

*Primary Examiner* — Robert R Raevis
(74) *Attorney, Agent, or Firm* — Piloff Passino & Cosenza LLP; Rachel K. Piloff; Sean A. Passino

(57) ABSTRACT

A blood sample platelet uniform-mixing device for a blood analyzer includes a vortex oscillation device, the vortex oscillation device includes a fixing assembly, a rotating assembly and a vibrating assembly. The fixing assembly is used for fixing sample test tubes. The rotating assembly includes a rotating motor and a rotating disc. A rotating shaft of the rotating motor is connected with the rotating disc, the rotating disc is matched with the fixing assembly. A central axis of each of the sample test tubes fixed on the fixing assembly deviates from the rotating shaft of the rotating motor. The rotating assembly is used for rotating the fixing assembly and making a blood sample in each of the sample test tubes be in a vortex shape. The vibrating assembly is arranged on the fixing assembly.

8 Claims, 14 Drawing Sheets

(56) References Cited

FOREIGN PATENT DOCUMENTS

| | | | |
|---|---|---|---|
| CN | 114983116 | A | 9/2022 |
| CN | 115266294 | * | 11/2022 |
| JP | 2008289442 | A | 12/2008 |
| JP | 2014115301 | A | 6/2014 |
| JP | 2015068701 | A | 4/2015 |

* cited by examiner

BLOOD SAMPLE PLATELET UNIFORM-MIXING DEVICE FOR BLOOD ANALYZER

CROSS-REFERENCE TO RELATED APPLICATIONS

This application claims priority of Chinese Patent Application No. 202310221185.8, filed on Mar. 9, 2023, the entire contents of which are incorporated herein by reference.

TECHNICAL FIELD

The application relates to the technical field of blood analyzer detection, and in particular to a blood sample platelet uniform-mixing device for a blood analyzer.

BACKGROUND

Blood analyzer is an instrument used for detecting blood samples, analyzing the tangible components in blood qualitatively and quantitatively, and providing relevant information. Usually, the blood analyzer analyzes the red blood cells, white blood cells, platelets and other cells and existence ratio in the blood quantitatively and qualitatively by means of combining electrical impedance, scattered light and fluorescent dye, and providing alarm information.

In the process of blood sample detecting, sometimes the platelet count is low. One of the main reasons is that platelets in blood samples are aggregated. When platelets are aggregated, their volume is much larger than normal platelets, which makes the blood analyzer mistake aggregated platelets for white blood cells to count, therefore leading to a false decrease in platelet count result.

At present, when the platelet count result is falsely decreased, the oscillation method is usually adopted, and the blood sample in the sample test tube is oscillated to disaggregate the platelets aggregated in the sample test tube, thus alleviating the false decrease of the platelet count result.

At present, when the sample test tube is being oscillated, the sample test tube is usually placed on an oscillator to oscillate, and the blood sample in the sample test tube will collide with the inner wall of the sample test tube back and forth, so that the aggregated platelets are able to be disaggregated. However, in this process, due to the different distances between blood samples in different parts of the sample test tube and the side wall of the sample test tube, the blood sample at the central axis of the sample test tube is oscillated to a different degree from the blood sample near the side wall of the sample test tube, and uneven oscillation will occur in the process of single oscillation, in which the blood sample at the central axis of the sample test tube is oscillated to a lesser degree than blood sample near the side wall of the sample test tube.

Further, when the platelets in the blood sample located at the central axis of the sample test tube are disaggregated, the blood sample near the side wall of the sample test tube will be oscillated intensely, and the red blood cells in the blood sample near the side wall of the sample test tube will be broken into fragments due to excessive vibration, which will increase the platelet count and affect the platelet count.

However, when the platelets in the blood sample at the side wall of the sample test tube are disaggregated, the blood sample at the central axis of the sample test tube is insufficiently oscillated due to the uneven oscillation degree, which is not conducive to the disaggregation of platelets, and then affects the platelet count.

Therefore, based on the above shortcomings, it is urgent to design a blood sample platelet uniform-mixing device for a blood analyzer to make the vibration degree of sample blood more uniform.

SUMMARY

The purpose of the application is to provide a blood sample platelet uniform-mixing device for a blood analyzer, aiming at the above shortcomings in the actual operation process of blood analysis at present, so as to make the vibration degree of the sample blood more uniform.

In order to achieve the above object, the present application provides the following technical scheme.

A blood sample platelet uniform-mixing device for a blood analyzer includes a vortex oscillation device. The vortex oscillation device includes a fixing assembly, a rotating assembly and a vibrating assembly. The fixing assembly is used for fixing sample test tubes. The rotating assembly includes a rotating motor and a rotating disc. The rotating shaft of the rotating motor is connected with the rotating disc. The rotating disc is matched with the fixing assembly. The central axis of each of the sample test tubes fixed on the fixing assembly deviates from the rotating shaft of the rotating motor. The rotating assembly is used for rotating the fixing assembly and making the blood sample in each of sample test tubes be in a vortex shape. The vibrating assembly is arranged on the fixing assembly. The vibrating assembly is used for vibrating the sample test tubes after the blood sample is in a vortex shape.

As the preferred technical scheme of the application, the rotating disc is provided with an adapter. The adapter is fixedly connected with the fixing assembly. The adapter is rotatably connected with the rotating disc. Annular teeth are circumferentially distributed on the outer side of the adapter. The rotating assembly also includes a gear ring. The gear ring is fixed with the rotating motor, and the inner ring of the gear ring is meshed with the annular teeth.

As the preferred technical scheme of the application, the end part of the adapter connected with the fixing assembly is an elastic part, and the elastic part has elasticity. When the rotating motor drives the sample test tubes to rotate, the elastic part is capable of generating deformation to tilt the sample test tubes.

As the preferred technical scheme of the application, the fixing assembly includes an upper cover and a lower cover. The upper cover is fixed with the adapter, the upper cover is connected with the lower cover, and the upper cover and the lower cover are used for clamping the sample test tubes along the length directions of the sample test tubes.

As the preferred technical scheme of the application, the upper cover and the lower cover are connected through a telescopic rod, and the telescopic rod is an electric telescopic rod or a pneumatic telescopic rod.

As the preferred technical scheme of the application, the telescopic rod is located at the side edge of the lower cover.

As the preferred technical scheme of the application, the vibrating assembly includes a vibrator. The vibrator is arranged on the lower cover. The vibrator is capable of driving the sample test tubes on the lower cover to vibrate jointly.

As the preferred technical scheme of the application, the upper cover and the lower cover are both cylindrical structures with one end sealed, and each of the sample test tubes is adapted to the cylindrical structures of the upper cover and the lower cover.

As the preferred technical scheme of the application, the lower cover includes a lower cover body and a lower cover plate. The lower cover body is in a cylindrical structure with one end sealed. The lower cover plate is in a plate shape. The lower cover plate is positioned below the lower cover body. The lower cover body and the lower cover plate are connected through a spring. The spring is elastic. The vibrator is arranged on the lower cover body. The lower cover plate is connected with the telescopic rod.

As the preferred technical scheme of the application, the inner side wall of the upper cover is provided with an elastic pad. The elastic pad is elastic. The elastic pad cooperates with the upper cover to clamp the side wall of each of sample test tubes.

Compared with the prior art, the application has following beneficial effects.

In the schemes of the application, the sample test tubes are fixed by the fixing assembly, and at the same time, under the action of the rotating assembly, the central axis of each of sample test tubes fixed on the fixing assembly deviates from the rotating shaft. When the rotating motor is driven to rotate, the fixing assembly rotates and the blood sample in each of the sample test tubes is in a vortex shape, so that the blood sample in each of sample test tubes is close to the side wall of each of the test tubes. When the vibrating assembly vibrates each of sample test tubes in which the blood sample is in a vortex shape, the blood sample is close to the side wall of each of sample test tubes, so that the distribution of the blood sample at the central axis in each of test tubes is reduced. When the vibration is transmitted from the tube wall of the sample test tubes to the sample blood, the vibration degree of the sample blood is more uniform. When the aggregated platelets are disaggregated to a greater extent, the situation that the platelet count is affected by the breakage of red blood cells due to excessive local vibration is capable of being reduced, thereby improving the accuracy of platelet count.

Furthermore, the adapter is arranged on the rotating disc, and the annular teeth are circumferentially distributed on the outer side of the adapter, the gear ring is fixed with the rotating motor, and the inner ring of the gear ring is meshed with the annular teeth. When the rotating motor drives the sample test tubes on the fixing assembly to rotate around the rotating shaft of the rotating motor, the fixing assembly and the sample test tubes rotate together under the action of the gear ring and the annular teeth, and the direction in which the fixing assembly and the sample test tubes rotate together is opposite to the direction in which the sample test tubes rotates around the rotating shaft of the rotating motor, so that the rotation direction of the sample test tubes is opposite to the flowing direction of the blood sample, thereby further facilitating the blood sample in each of sample test tubes to rotate around the inner walls of the sample test tubes and facilitating the blood sample in each of sample test tubes to form a vortex shape.

Further, the end part of the adapter connected with the fixing assembly is an elastic part. The elastic part is elastic, so that when the rotating motor drives the sample test tubes to rotate, the elastic part is capable of elastically generating elastic deformation to tilt the sample test tubes, further making the blood sample in each of sample test tubes lean to one side of the sample test tube. When the sample test tubes rotate around the rotating shaft of the rotating motor, it is convenient for the blood sample to flow along the side wall of each of sample test tubes, which is further beneficial for the blood sample in each of sample test tubes to form a vortex shape.

Further, the vibrating assembly includes the vibrator. The vibrator is arranged on the lower cover, so that the vibrator transmits vibration from the lower cover to the sample test tubes, and further transmits vibration to the blood sample in each of sample test tubes. In this process, the bottoms of the sample test tubes are closer to the vibrator, thereby further improving the vibration effect of the vibrator on the blood sample in each of sample test tubes.

DETAILED DESCRIPTION OF THE EMBODIMENTS

Figure 1:
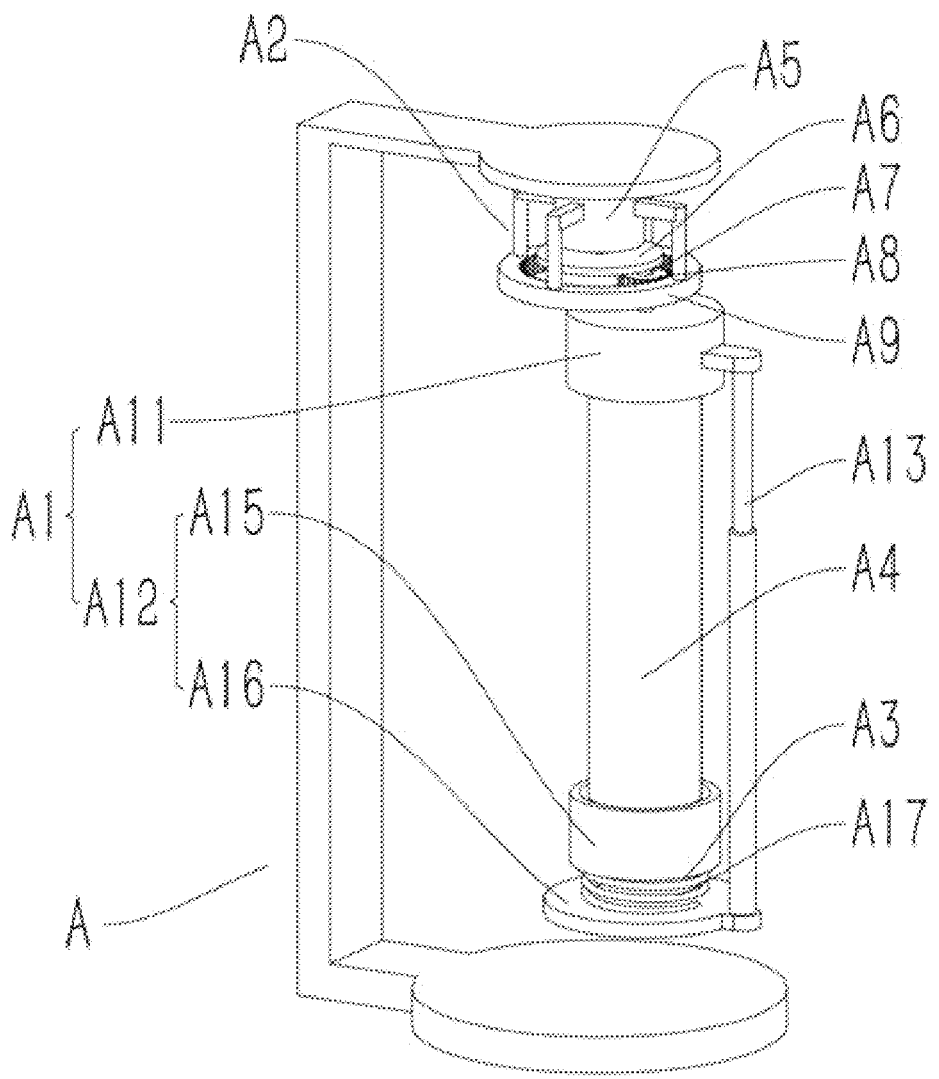
FIG. 1 is a schematic structural diagram of a vortex oscillation device of a blood sample platelet uniform-mixing device for a blood analyzer in one embodiment of the present application.
Figure 2:
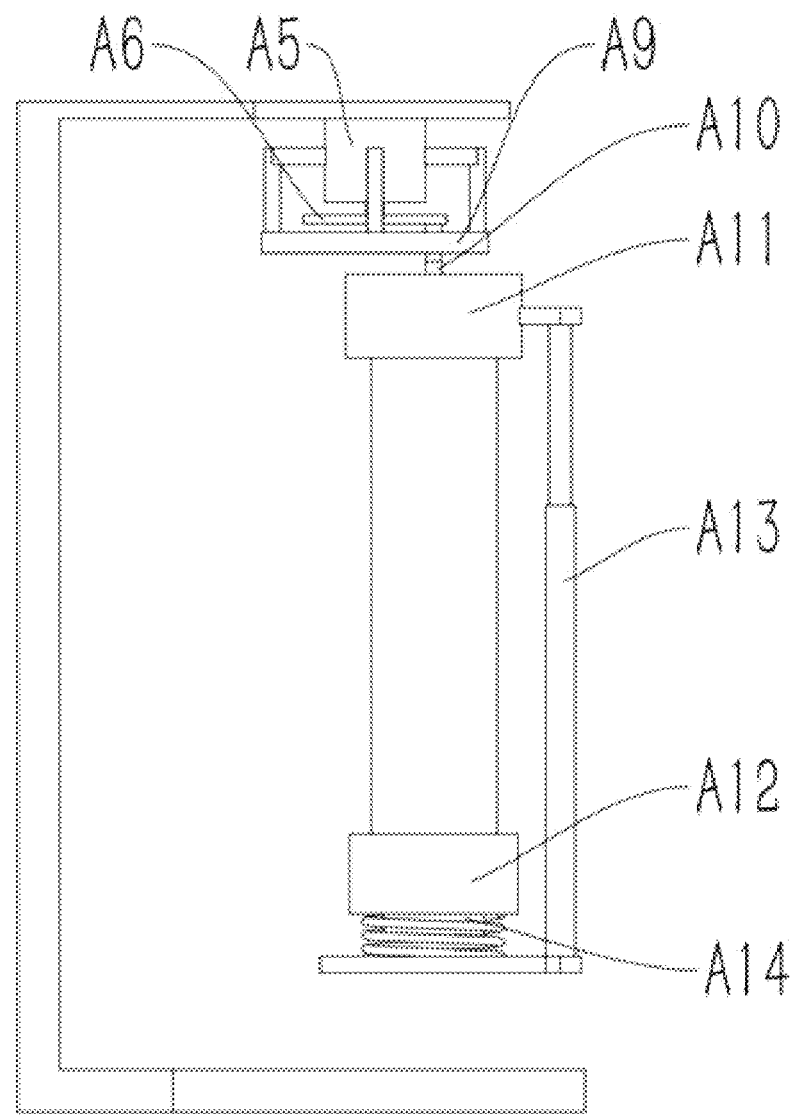
FIG. 2 is a schematic structural view from another perspective of a vortex oscillation device of a blood sample platelet uniform-mixing device for a blood analyzer in one embodiment of the present application.
Figure 3:
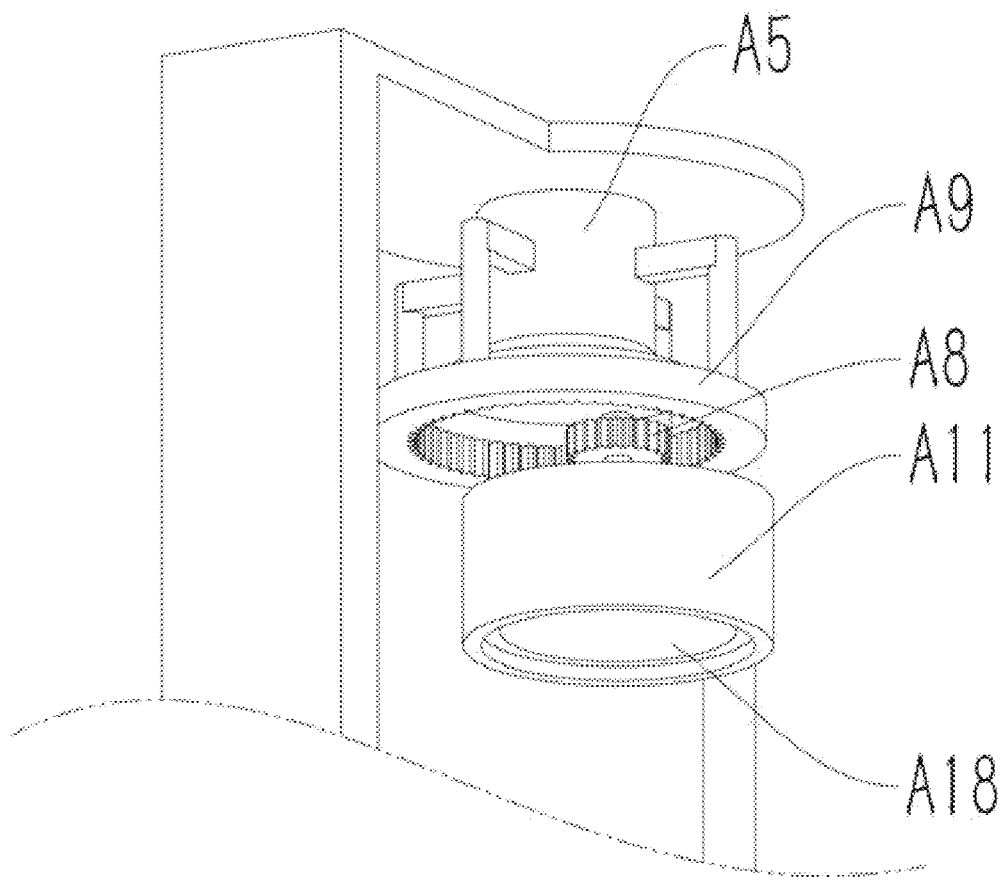
FIG. 3 is a partial structural schematic diagram of a vortex oscillation device of a blood sample platelet uniform-mixing device for a blood analyzer in one embodiment of the present application.
Figure 4:
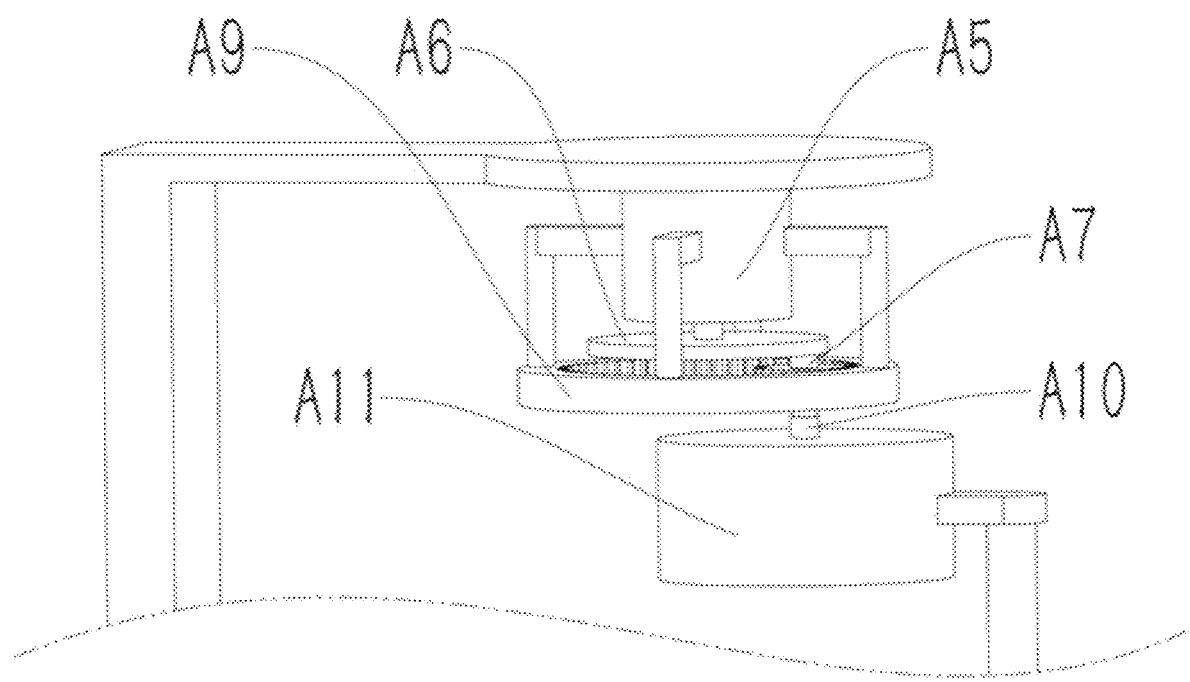
FIG. 4 is a partial structural diagram from another perspective of a vortex oscillation device of a blood sample platelet uniform-mixing device for a blood analyzer in one embodiment of the present application.

In order to make the purpose, technical scheme and advantages of the embodiment of the application clearer, the technical scheme in the embodiment of the application will be described clearly and completely with the attached drawings. Obviously, the described embodiment is a part of the embodiments of the present application, but not the whole embodiment.

Therefore, the following detailed description of the embodiments of the present application is not intended to limit the scope of the claimed application, but only represents some embodiments of the present application. Based on the embodiments in the present application, all other embodiments obtained by ordinary technicians in the field without creative work fall in the scope of protection of the present application.

It should be noted that the embodiments in the present application and the features and technical solutions in the embodiments may be combined with each other without conflict.

It should be noted that similar symbols and letters indicate similar elements in the following drawings, so once an element is defined in one drawing, it does not need to be further defined and explained in subsequent drawings.

In the description of the present application, it should be noted that the azimuth or positional relationship indicated by the terms "upper" and "lower" is based on the azimuth or positional relationship shown in the attached drawings, or the azimuth or positional relationship that the product of the present application is usually placed in use, or the azimuth or positional relationship that is commonly understood by those skilled in the art. Such terms are only for the convenience of describing the present application and simplifying the description, and do not indicate or imply that the device or element referred to must have a specific orientation, be constructed and operated in a specific orientation. In addition, the terms "first", "second" and so on are only used to distinguish descriptions, and cannot be understood as indicating or implying relative importance.

Embodiment 1

A blood sample platelet uniform-mixing device for a blood analyzer provided by this embodiment is used in conjunction with a blood analyzer. As shown in FIG. 1-FIG. 4, the blood sample platelet uniform-mixing device for the blood analyzer includes a vortex oscillation device A. The vortex oscillation device A includes a fixing assembly A1, a rotating assembly A2 and a vibrating assembly A3. The fixing assembly A1 is used for fixing a sample test tube A4. The rotating assembly A2 includes a rotating motor A5 and a rotating disc A6. The rotating shaft of the rotating motor A5 is connected with the rotating disc A6. The rotating disc A6 is matched with the fixing assembly A1. The central axis of the sample test tube A4 fixed on the fixing assembly A1 deviates from the rotating shaft of the rotating motor A5. The rotating assembly A2 is used for rotating the fixing assembly A1 and making the blood sample in the sample test tube A4 be in a vortex shape. The vibrating assembly A3 is arranged on the fixing assembly A1. The vibrating assembly A3 is used for vibrating the sample test tube A4 after the blood sample is in a vortex shape. After the vibration is completed, the sample test tube A4 is taken down and put into a blood analyzer for subsequent detection steps. In this application, the blood analyzer is a conventional blood sample analyzer at present, which is not shown in the scheme of this application.

In this embodiment, the sample test tube A4 is fixed by the fixing assembly A1, and at the same time, under the action of the rotating assembly A2, the central axis of the sample test tube A4 fixed on the fixing assembly A1 deviates from the rotating shaft. When the rotating motor A5 is driven to rotate, the fixing assembly A1 rotates and the blood sample in the sample test tube A4 is in a vortex shape, so that the blood sample in the sample test tube A4 is close to the side wall of the test tube. When the vibrating assembly A3 vibrates the sample test tube A4 in which the blood sample is in a vortex shape, the blood sample is close to the side wall of the sample test tube A4, so that the distribution of the blood sample at the central axis in the test tube is reduced. When the vibration is transmitted from the tube wall of the sample test tube A4 to the sample blood, the vibration degree of the sample blood is more uniform. When the aggregated platelets are disaggregated to a greater extent, the situation that the platelet count is affected by the breakage of red blood cells due to excessive local vibration is capable of being reduced, thereby improving the accuracy of platelet count.

As a preferred embodiment, on the basis of the above mode, further, the rotating disc A6 is provided with an adapter A7. The adapter A7 is fixedly connected with the fixing assembly A1. The adapter A7 is rotatably connected with the rotating disc A6, and the outer side of the adapter A7 is circumferentially distributed with annular teeth A8. The rotating assembly A2 also includes the gear ring A9. The gear ring A9 is fixed with the rotating motor A5, and the inner ring of the gear ring A9 is meshed with the annular teeth A8.

Furthermore, the adapter A7 is arranged on the rotating disc A6, and annular teeth A8 are circumferentially distributed on the outer side of the adapter A7, the gear ring A9 is fixed with the rotating motor A5, and the inner ring of the gear ring A9 is meshed with the annular teeth A8. When the rotating motor A5 drives the sample test tube A4 on the fixing assembly A1 to rotate around the rotating shaft of the rotating motor A5, under the action of the gear ring A9 and the annular teeth A8, the fixing assembly A1 and the sample test tube A4 rotate together, and the direction in which the fixing assembly A1 and the sample test tube A4 rotate together is opposite to the direction in which the sample test tube A4 rotates around the rotating shaft of the rotating motor A5, so the rotation direction of the sample test tube A4 is opposite to the flowing direction of the blood sample, which further facilitates the blood sample in the sample test tube A4 to rotate around the inner wall of the sample test tube A4 and facilitates the blood sample in the sample test tube A4 to form a vortex shape.

As a preferred embodiment, on the basis of the above mode, further, the end part of the adapter A7 connected with the fixing assembly A1 is an elastic part A10. The elastic part A10 is elastic. The elastic part A10 is capable of generating deformation to tilt the sample test tube A4 when the rotating motor A5 drives the sample test tube A4 to rotate.

Further, the end part of the adapter A7 connected with the fixing assembly A1 is an elastic part A10 with elasticity, so that when the rotating motor A5 drives the sample test tube A4 to rotate, the elastic part A10 is capable of being elastically deformed and make the sample test tube A4 tilt, so that the blood sample in the sample test tube A4 leans to one side of the sample test tube A4. When the sample test tube A4 rotates around the rotating shaft of the rotating motor A5, it is convenient for the blood sample to flow along the side wall of the sample test tube A4, which is further beneficial for the blood sample in the sample test tube A4 to form a vortex shape.

Embodiment 2

On the basis of the technical scheme of the embodiment 1, further, as shown in FIG. 1-FIG. 4, the fixing assembly A1 includes an upper cover A11 and a lower cover A12. The upper cover A11 is fixed with the adapter A7, and the upper cover A11 is connected with the lower cover A12. The upper cover A11 and the lower cover A12 are used for clamping the sample test tube A4 along the length direction of the sample test tube A4.

By arranging the upper cover A11 and the lower cover A12, the upper cover A11 and the lower cover A12 clamp the sample test tube A4 along the length direction of the sample test tube A4, and at the same time, the upper cover A11 is fixed with the adapter A7, so that it is convenient for the rotating motor A5 to drive the upper cover A11, the lower cover A12 and the sample test tube A4 to rotate. At the same time, the upper cover A11 is capable of blocking the sample test tube A4, which prevents the blood sample in the sample test tube A4 from spilling out of the sample test tube A4 during vibration. Compared with clamping the side wall of the sample test tube A4, the stability of clamping the sample test tube A4 is improved by fixing the upper and lower ends of the sample test tube A4.

As a preferred embodiment, on the basis of the above mode, further, the upper cover A11 and the lower cover A12 are connected by the telescopic rod A13. The telescopic rod A13 is an electric telescopic rod or a pneumatic telescopic rod.

Further, the upper cover A11 and the lower cover A12 are connected by the telescopic rod A13. The telescopic rod A13 is the electric telescopic rod or the pneumatic telescopic rod. By controlling the telescopic rod A13, the distance between the upper cover A11 and the lower cover A12 is changed, so that the sample test tube A4 is conveniently fixed by the upper cover A11 and the lower cover A12, and the sample test tube A4 is also conveniently taken out from between the upper cover A11 and the lower cover A12.

As a preferred embodiment, on the basis of the above mode, further, the telescopic rod A13 is located at the side edge of the lower cover A12.

Further, the telescopic rod A13 is located at the side edge of the lower cover A12, so that when the upper cover A11 and the lower cover A12 clamp the sample test tube A4, the weight of the fixing assembly A1 on the side of the telescopic rod A13 is greater. When the rotating motor A5 drives the fixing assembly A1 and the sample test tube A4 to rotate, the counterweight of the telescopic rod A13 is convenient for the sample test tube A4 to swing around the elastic part A10 on the adapter A7 in a single direction. The single direction refers to the counterclockwise or clockwise direction, thereby further facilitating the blood sample in the sample test tube A4 to flow against the inner side wall of the sample test tube A4.

As a preferred embodiment, on the basis of the above mode, further, the vibrating assembly A3 includes a vibrator A14. The vibrator A14 is arranged on the lower cover A12. The vibrator A14 is capable of driving the sample test tube A4 on the lower cover A12 to vibrate jointly.

Further, the vibrating assembly A3 includes the vibrator A14, and the vibrator A14 is arranged on the lower cover A12, so that the vibrator A14 transmits vibration from the lower cover A12 to the sample test tube A4 and then to the blood sample in the sample test tube A4. In this process, the bottom of the sample test tube A4 is closer to the vibrator A14, which further improves the vibration effect of the vibrator A14 on the blood sample in the sample test tube A4.

Embodiment 3

On the basis of the technical scheme of embodiment 2, further, as shown in FIG. 1-FIG. 4, the upper cover A11 and the lower cover A12 are both cylindrical structures with one end sealed, and the sample test tube A4 is adapted to the cylindrical structures of the upper cover A11 and the lower cover A12.

Further, by arranging the upper cover A11 and the lower cover A12 into cylindrical structures with one end sealed, it is convenient to place the sample test tube A4 in the upper cover A11 and the lower cover A12. During the rotation of the sample test tube A4, the side walls of the upper cover A11 and the lower cover A12 are both capable of limiting the sample test tube A4, which improves the stability of the sample test tube A4 being clamped by the upper cover A11 and the lower cover A12.

As a preferred embodiment, on the basis of the above mode, the lower cover A12 further includes a lower cover body A15 and a lower cover plate A16. The lower cover body A15 is in a cylindrical structure with one end sealed, and the lower cover plate A16 is in a plate shape, and the lower cover plate A16 is located below the lower cover body A15, and the lower cover body A15 and the lower cover plate A16 are connected by a spring A17. The spring A17 is elastic. The vibrator A14 is arranged on the lower cover body A15, and the lower cover plate A16 is connected with the telescopic rod A13.

Further, by arranging the lower cover body A15 and the lower cover plate A16, connecting the lower cover body A15 and the lower cover plate A16 through the spring A17, and arranging the vibrator A14 on the lower cover body A15, when the vibrator A14 vibrates, the vibration of the vibrator A14 is transmitted to the lower cover body A15 and then to the sample test tube A4. Under the action of the spring A17, the lower cover body A15 is capable of moving relative to the upper cover A11, thereby further increasing the vibration amplitude of the sample test tube A4, thereby improving the vibration effect of the blood sample and facilitating the disaggregation and uniform mixing of platelets in the blood sample.

As a preferred embodiment, on the basis of the above mode, further, the inner side wall of the upper cover A11 is provided with the elastic pad A18. The elastic pad A18 is elastic. The elastic pad A18 cooperates with the upper cover A11 to clamp the side wall of the sample test tube A4.

Further, by arranging the elastic pad A18 with elasticity on the inner side wall of the upper cover A11, the elastic pad A18 cooperates with the upper cover A11 to clamp the side wall of the sample test tube A4. When the sample test tube A4 is clamped, the elastic pad A18 improves the stability of clamping the sample test tube A4, and at the same time, when the vibrator A14 vibrates, it is beneficial for the sample test tube A4 to shake around the upper cover A11. In the process of shaking the sample test tube A4, the compression of one side of the elastic pad A18 facing the shaking direction of the sample test tube A4 is aggravated, and under the action of elastic force, it is convenient for the sample test tube A4 to be reset after shaking, which is further beneficial for the sample test tube A4 to shake in multiple directions more evenly, so that the blood sample in the sample test tube A4 is capable of being oscillated more evenly.

Embodiment 4

As shown in FIG. 5-FIG. 9, a blood sample platelet uniform-mixing device for a blood analyzer provided by this embodiment further includes a test tube bracket B, and the test tube bracket B further includes a bracket body B1. The bracket body B1 is provided with a plurality of placing grooves B3 for placing sample test tubes A4. Vibration units B4 adapted to the placing grooves B3 are arranged in the bracket body B1, and the vibration units B4 are used for driving the sample test tubes A4 placed in the placing grooves B3 to vibrate jointly.

In this embodiment, by arranging the vibration units B4 adapted to the placing grooves B3 in the bracket body B1, when the sample test tubes A4 are placed in the placing grooves B3, the vibration units B4 are capable of driving the sample test tubes A4 placed in the placing grooves B3 to vibrate jointly to promote the disaggregation of platelets in the blood samples in the sample test tubes A4, and it is unnecessary to take the sample test tubes A4 out of the test tube bracket B to disaggregate platelets when the sample injector is used for determination, thereby improving the efficiency and convenience of platelet disaggregation, and further improving the accuracy of platelet count.

As a preferred embodiment, on the basis of the above mode, further, the outer diameter of each of sample test tubes A4 is smaller than the inner diameter of each of placing grooves B3, and each of vibration units B4 is arranged at the bottom of corresponding one of placing grooves B3.

Furthermore, the outer diameter of each of the sample test tubes A4 is smaller than the inner diameter of each of placing grooves B3, which is convenient for placing the sample test tubes A4. At the same time, each of vibration units B4 is arranged at the bottom of corresponding one of placing grooves B3, and there is a gap between the side wall of each of sample test tubes A4 and the side wall of corresponding one of placing grooves B3, which is convenient for the vibration units B4 to drive the sample test tubes A4 to vibrate jointly, and is capable of improving the oscillation effect of the blood sample in each of sample test tubes A4.

As a preferred embodiment, on the basis of the above mode, further, a first spring B5 is connected below each of vibration units B4, and the first spring B5 is connected with the bottom of each of placing grooves B3.

Further, by connecting the first spring B5 below each of vibration units B4, and at the same time, by arranging the first spring B5 with the each of placing grooves B3, when the one sample test tubes A4 is placed on corresponding one of placing grooves B3, the one sample test tubes A4 contact corresponding one of vibration units B4, and at the same time, the first spring B5 is compressed. When the vibration units B4 are started, the vibration units B4 drive the sample test tubes A4 to vibrate. Under the action of the first spring B5, the vibration of the vibration units B4 to the bracket body B1 is reduced, so that the influence of the vibrating one of sample test tubes A4 on other sample test tubes A4 on the test tube bracket B is capable of being reduced, and it is convenient to oscillate a single sample test tube A4 on the test tube bracket B alone.

Embodiment 5

On the basis of the technical scheme of embodiment 4, further, as shown in FIG. 1-FIG. 9, a tray B6 is connected above each of vibration units B4. The tray B6 is used to contact with the bottom of each of sample test tubes A4, and a baffle B7 is arranged on the tray B6. The baffle B7 is arranged around the tray B6. When one of sample test tubes A4 is placed in corresponding one of placing grooves B3, there is a gap between one of sample test tubes A4 and the baffle B7. When the vibration units B4 drive the sample test tubes A4 to vibrate, the baffle B7 collides with the side wall of one of sample test tubes A4.

By arranging the tray B6 and the baffle B7, and the baffle B7 is arranged around the tray B6. When one of sample test tubes A4 is placed in corresponding one of placing grooves B3, the vibration units B4 drive the tray B6 and the baffle B7 to vibrate, and at the same time, there is a gap between one of sample test tubes A4 and the baffle, so that the baffle B7 collides with the side wall of one of sample test tubes A4, thereby driving the blood samples in one of sample test tubes A4 to vibrate, so that the side wall of one of the sample test tubes A4 is driven by the baffle B7, and when vibrating, the stability and efficiency of the one of sample test tubes A4 are improved.

As a preferred embodiment, on the basis of the above mode, the baffle B7 is further provided with a first elastic pad B8 on the side facing one of sample test tubes A4, and the first elastic pad B8 is elastic.

Further, the first elastic pad B8 with elasticity is arranged on the baffle B7 facing one of sample test tubes A4, so that when the vibration units B4 drives corresponding one of sample test tubes A4 to vibrate, the corresponding one of sample test tubes A4 collides with the first elastic pad B8 on the baffle B7, and the first elastic pad B8 is capable of playing a buffering role, thus preventing the corresponding one of sample test tubes A4 from being damaged due to collision.

As a preferred embodiment, on the basis of the above mode, further, at least two second elastic pads B9 are arranged in each of placing grooves B3, and the second elastic pads B9 are located in the upper area in each of placing grooves B3. The second elastic pads B9 have elasticity, and the at least two second elastic pads B9 are used for clamping corresponding one of sample test tubes A4.

At least two second elastic pads B9 are arranged in the upper area in each of placing grooves B3, so that the second elastic pads B9 clamp corresponding one of sample test tubes A4, thereby improving the stability of placing each of the sample test tube A4 in corresponding one of placing grooves B3 and preventing each of sample test tube A4 from falling out of corresponding one of placing groove B3 during vibration.

Embodiment 6

Figure 7:
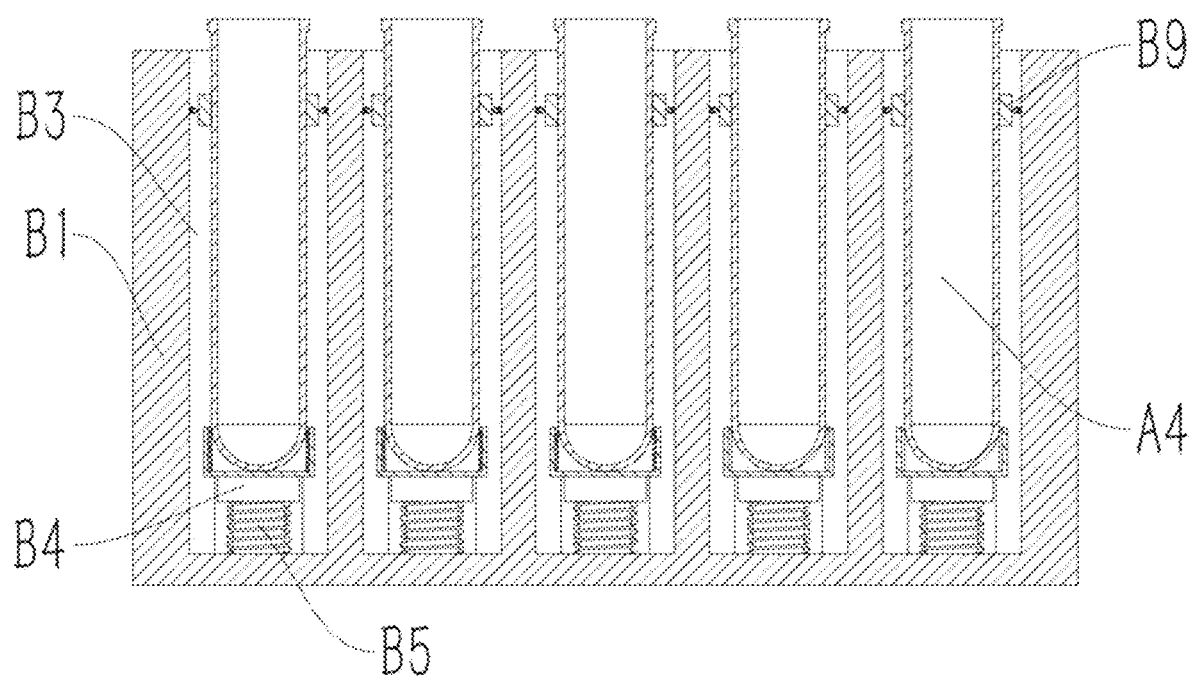
FIG. 7 is a schematic sectional view of a test tube bracket of a blood sample platelet uniform-mixing device for a blood analyzer in one embodiment of the present application.
Figure 8:
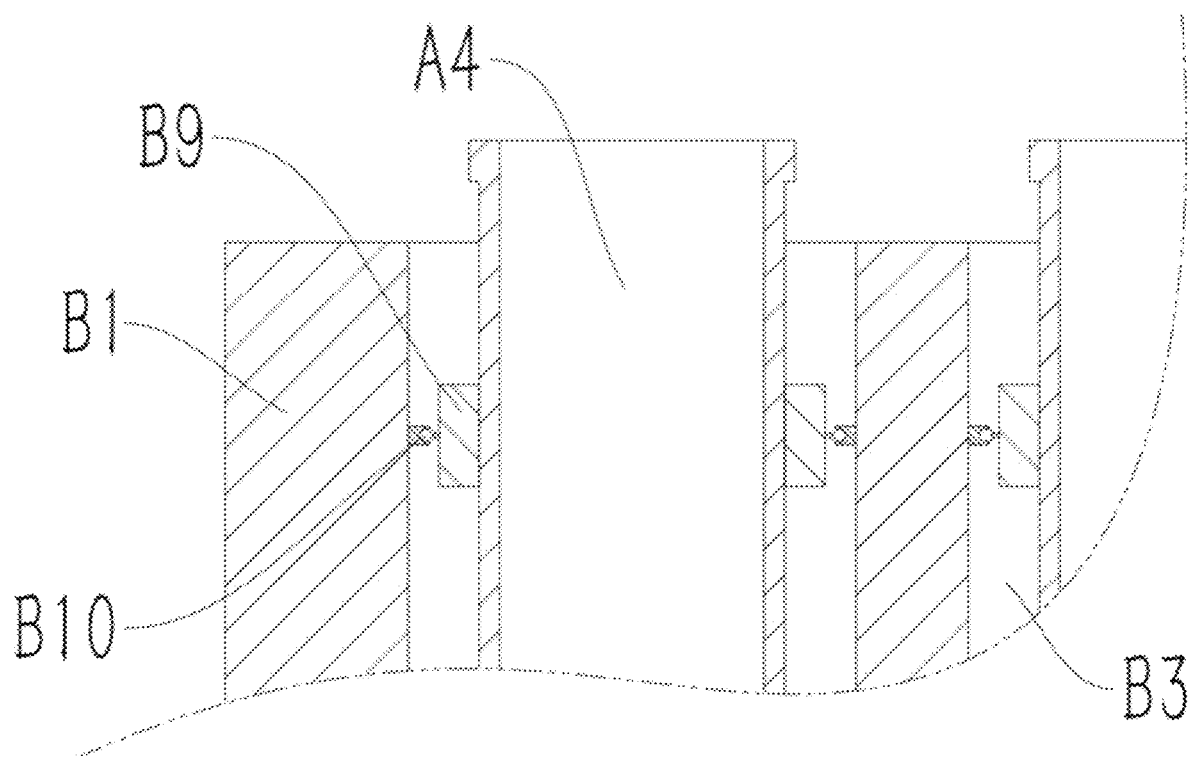
FIG. 8 is a schematic structural view of a partial cross-sectional view of a second elastic pad on a test tube bracket of a blood sample platelet uniform-mixing device for a blood analyzer in one embodiment of the present application.
Figure 9:
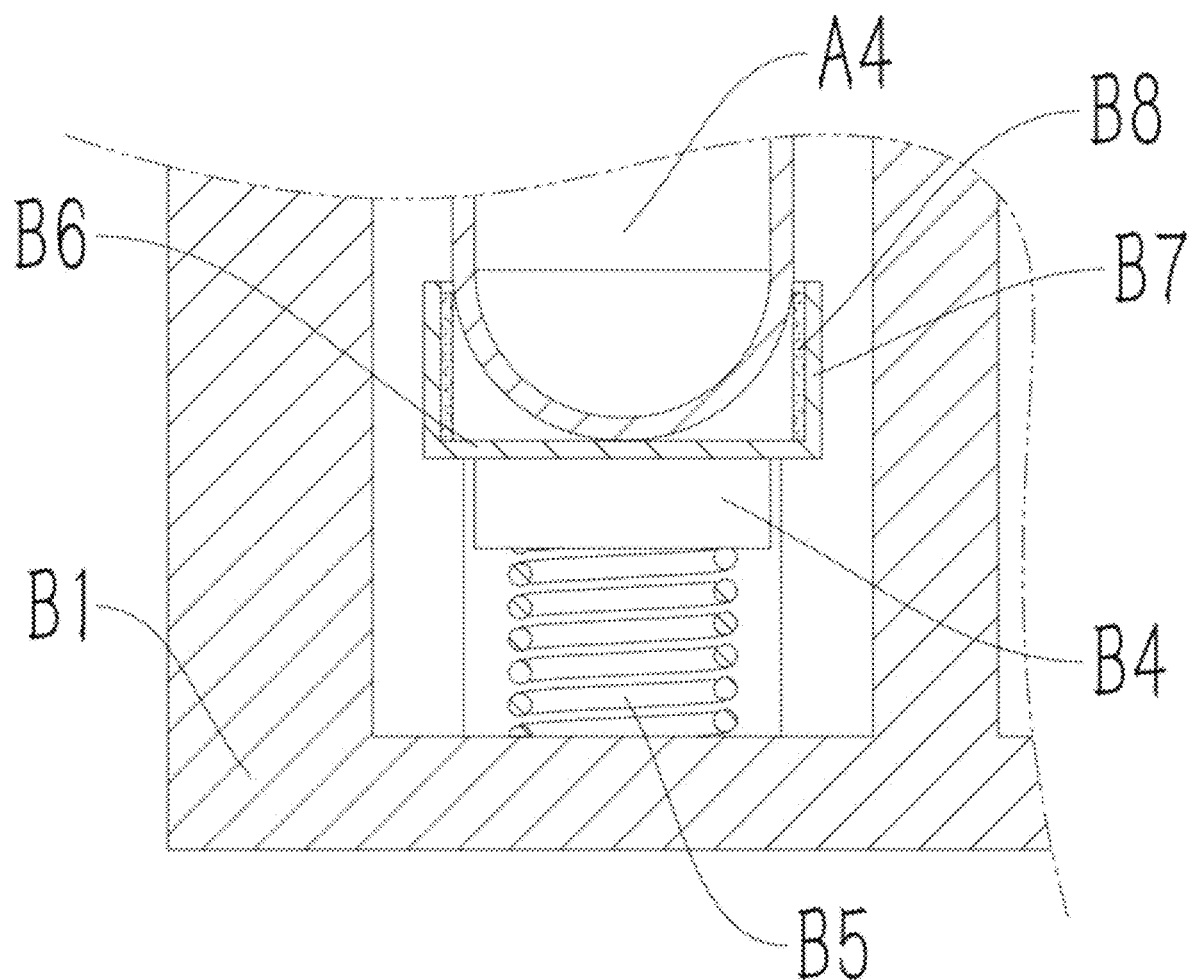
FIG. 9 is a schematic diagram of a partial structure of a tray on a test tube bracket of a blood sample platelet uniform-mixing device for a blood analyzer in one embodiment of the present application.

On the basis of the technical scheme of the embodiment 5, further, as shown in FIG. 7 and FIG. 8, each of the second elastic pads B9 is provided with a connector B10, and the connector B10 is connected with the side wall of each of placing grooves B3 by a ball hinge.

Further, by providing the each of second elastic pads B9 with the connector B10, and connecting the connector B10 with the side wall of each of placing grooves B3 by the ball hinge, after the second elastic pads B9 clamp corresponding one of sample test tubes A4, when the vibration units B4 vibrate the sample test tubes A4, the second elastic pads B9 rotate in multiple directions relative to the side walls of corresponding one placing grooves B3, so that the sample test tubes A4 are capable of tilting in multiple directions during the vibration process, which is further beneficial to the oscillation of the blood sample in the sample test tubes A4.

Embodiment 7

Figure 5:
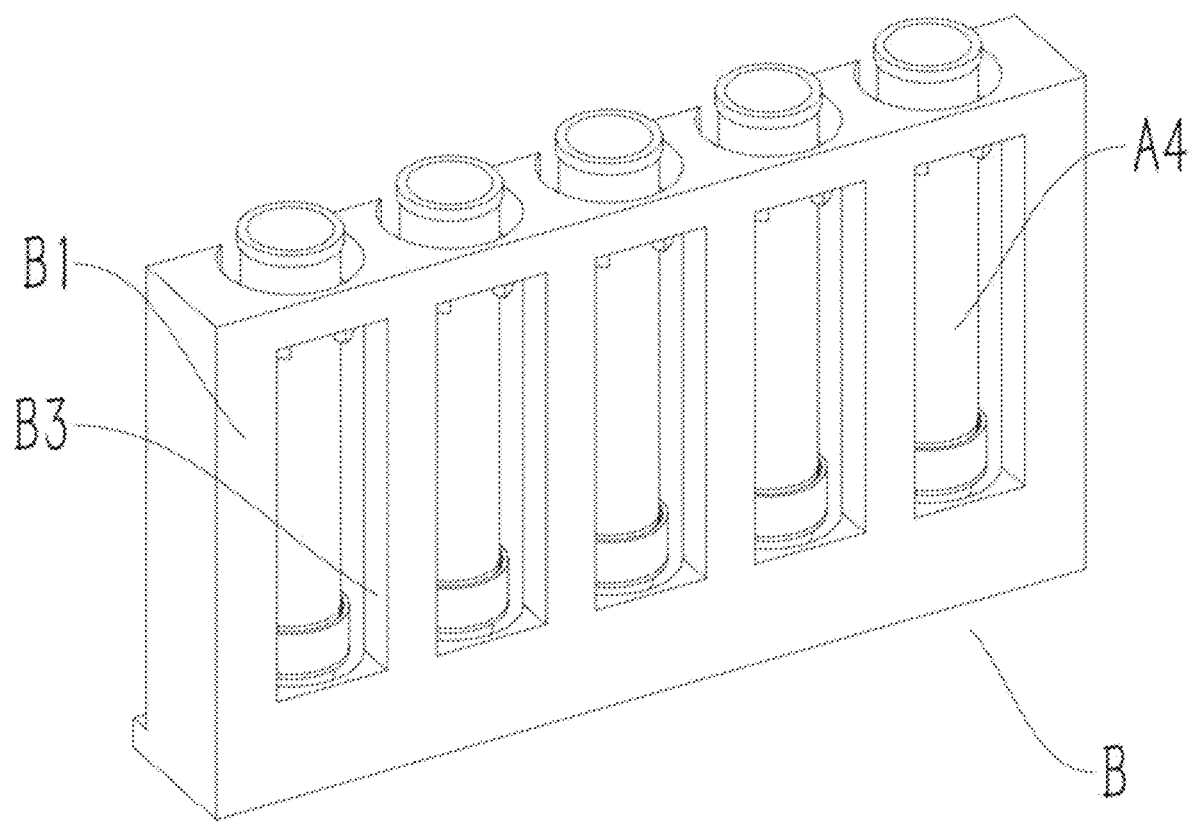
FIG. 5 is a schematic structural diagram of a test tube bracket of a blood sample platelet uniform-mixing device for a blood analyzer in one embodiment of the present application.
Figure 6:
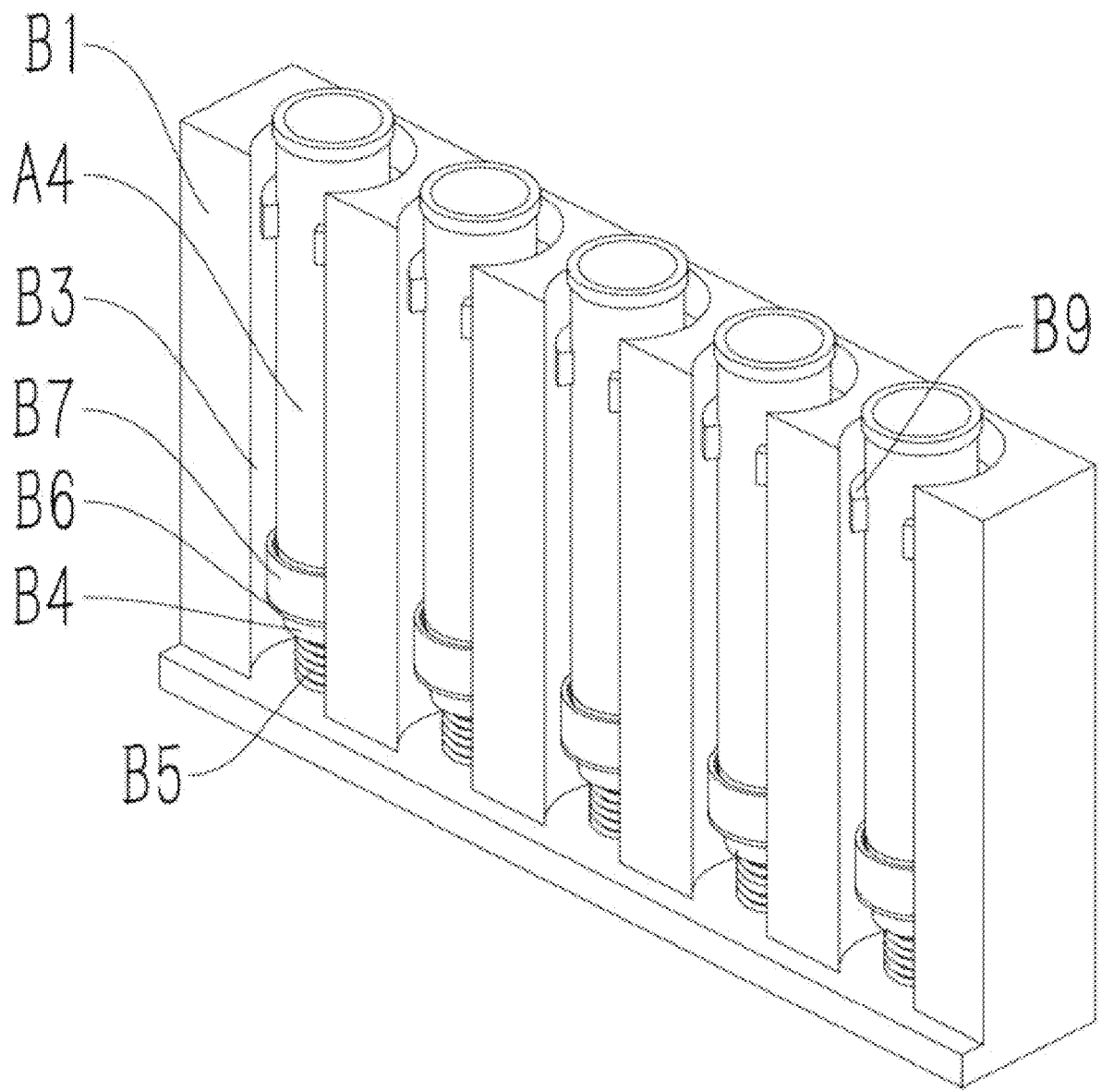
FIG. 6 is a schematic structural view from another perspective of a test tube bracket of a blood sample platelet uniform-mixing device for a blood analyzer in one embodiment of the present application.
Figure 10:
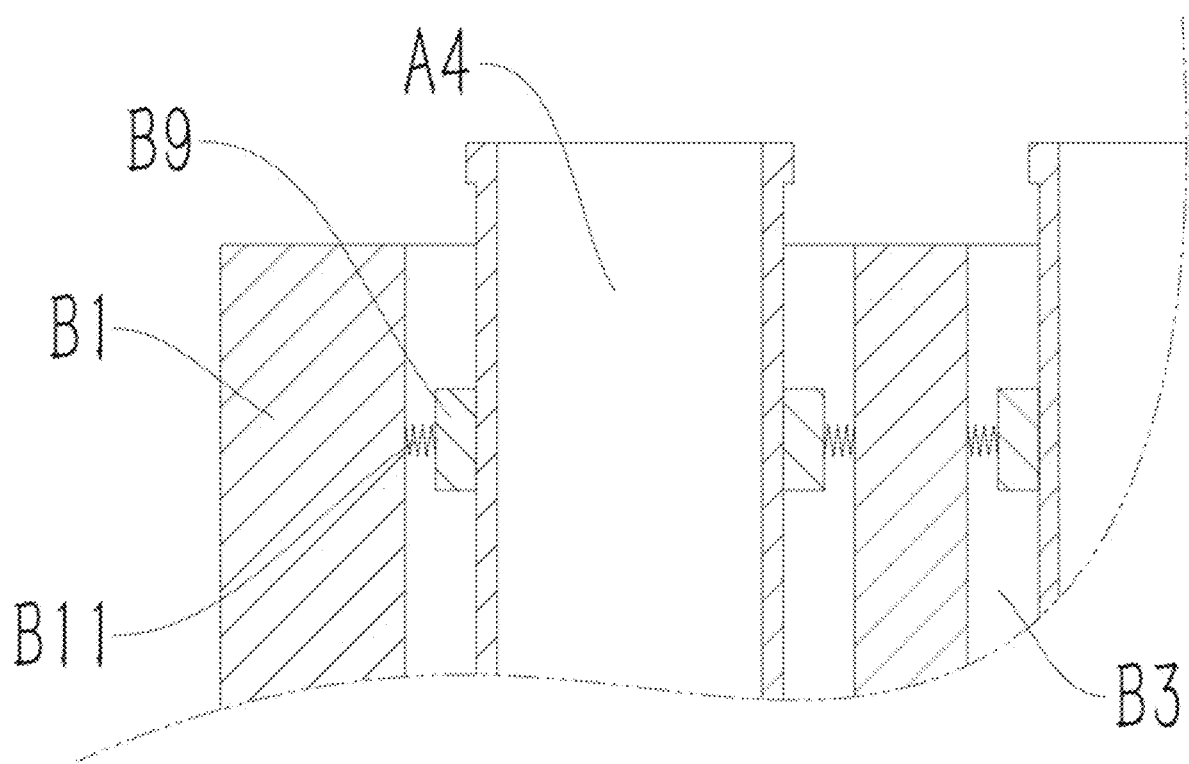
FIG. 10 is a schematic structural view of a partial cross-sectional view of a second elastic pad on a test tube bracket of a blood sample platelet uniform-mixing device for a blood analyzer in another embodiment of the present application.
Figure 11:
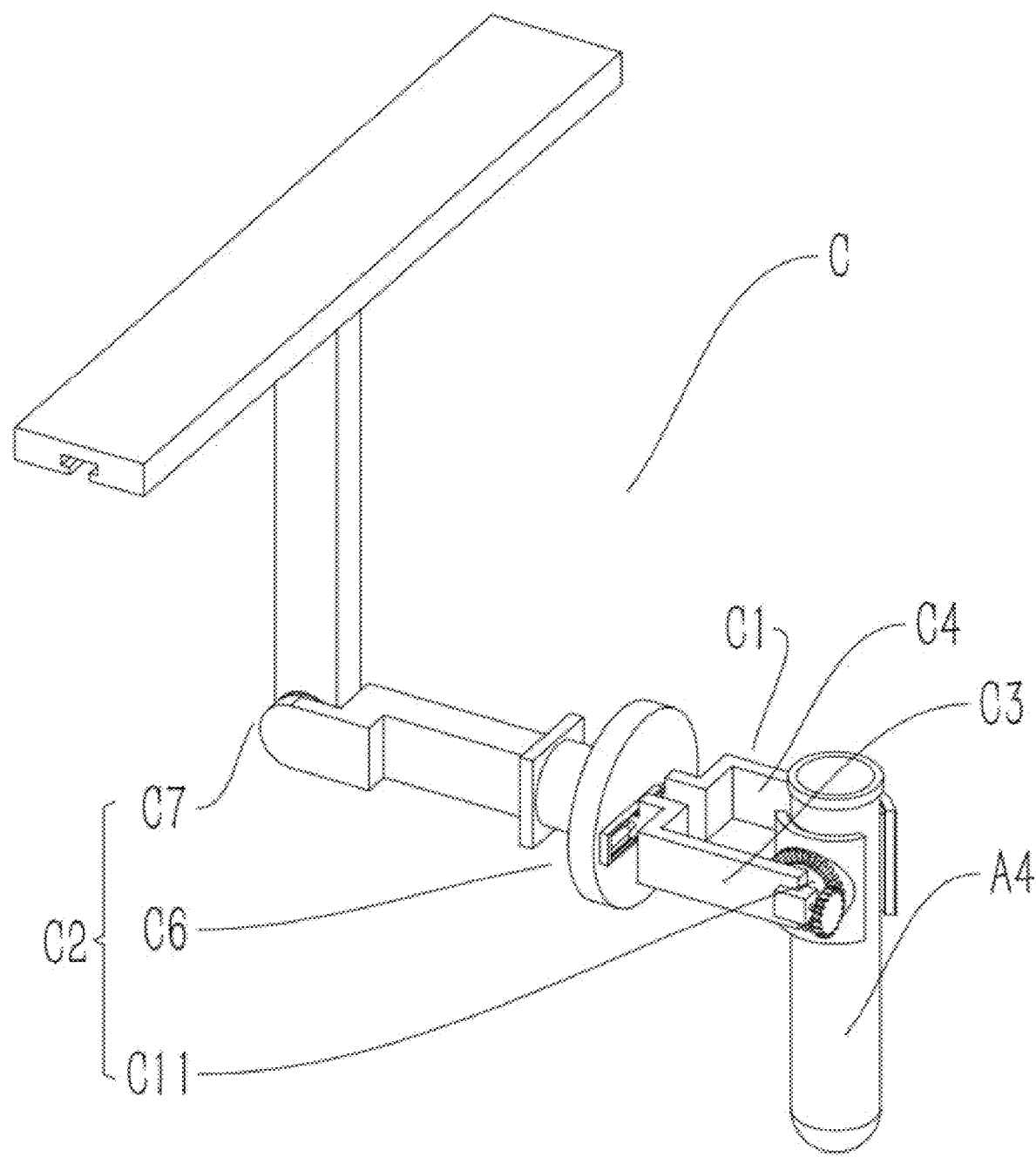
FIG. 11 is a schematic structural diagram of a swing oscillation device of a blood sample platelet uniform-mixing device for a blood analyzer in one embodiment of the present application.
Figure 12:
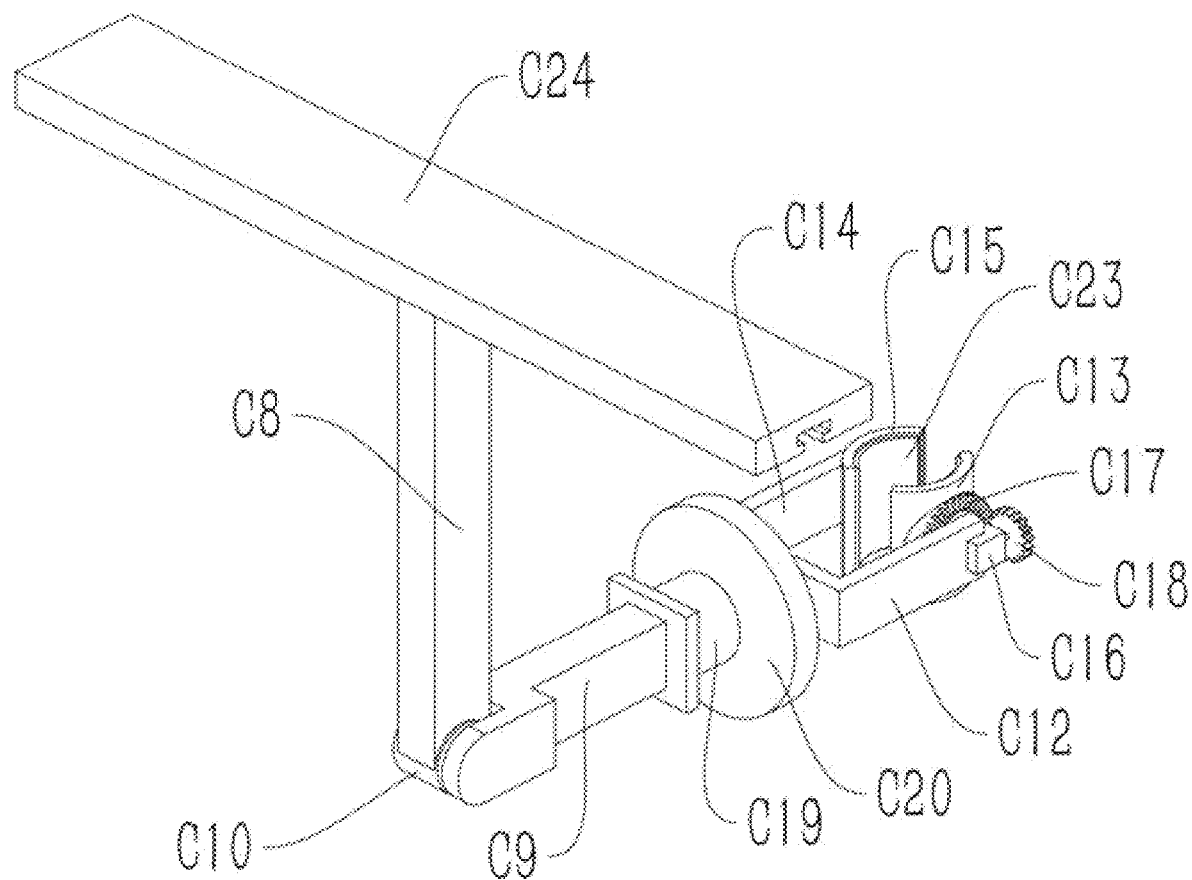
FIG. 12 is a schematic structural view from another perspective of a swing oscillation device of a blood sample platelet uniform-mixing device for a blood analyzer in one embodiment of the present application.
Figure 13:
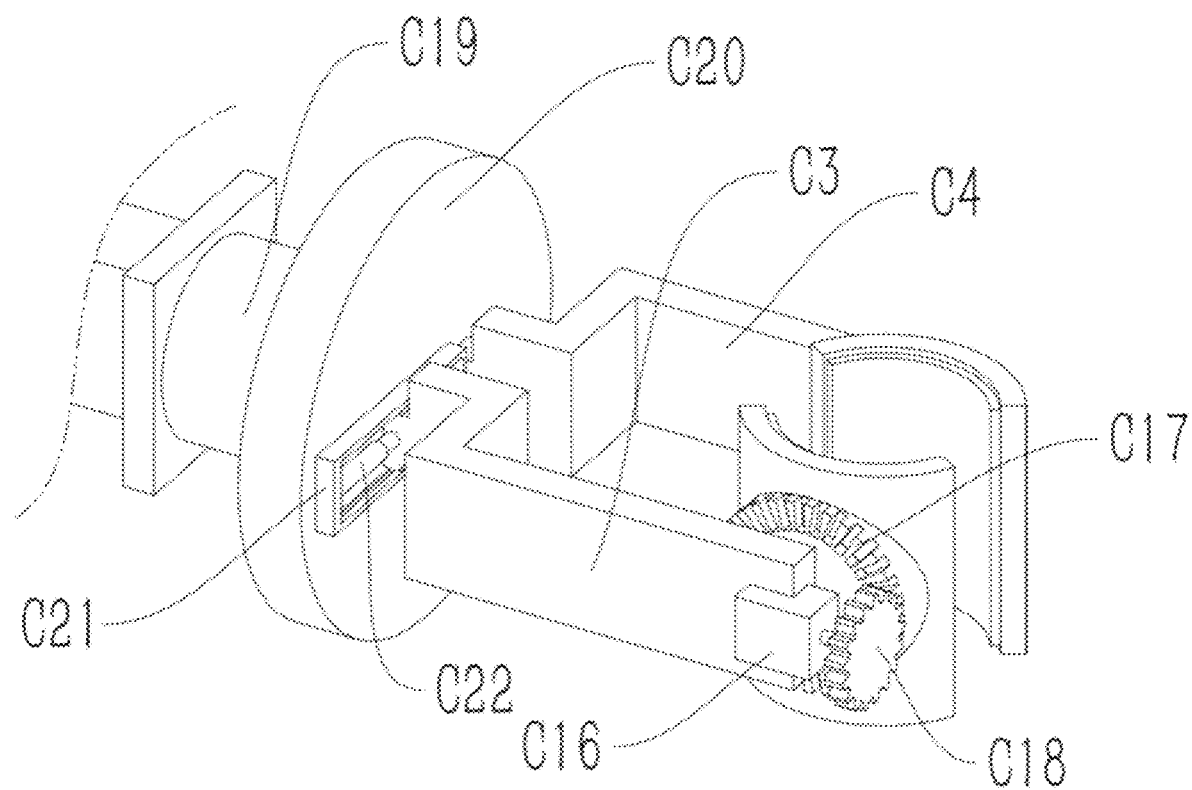
FIG. 13 is a schematic diagram of a partial structure of a gripper body on a swing oscillation device of a blood sample platelet uniform-mixing device for a blood analyzer in one embodiment of the present application.
Figure 14:
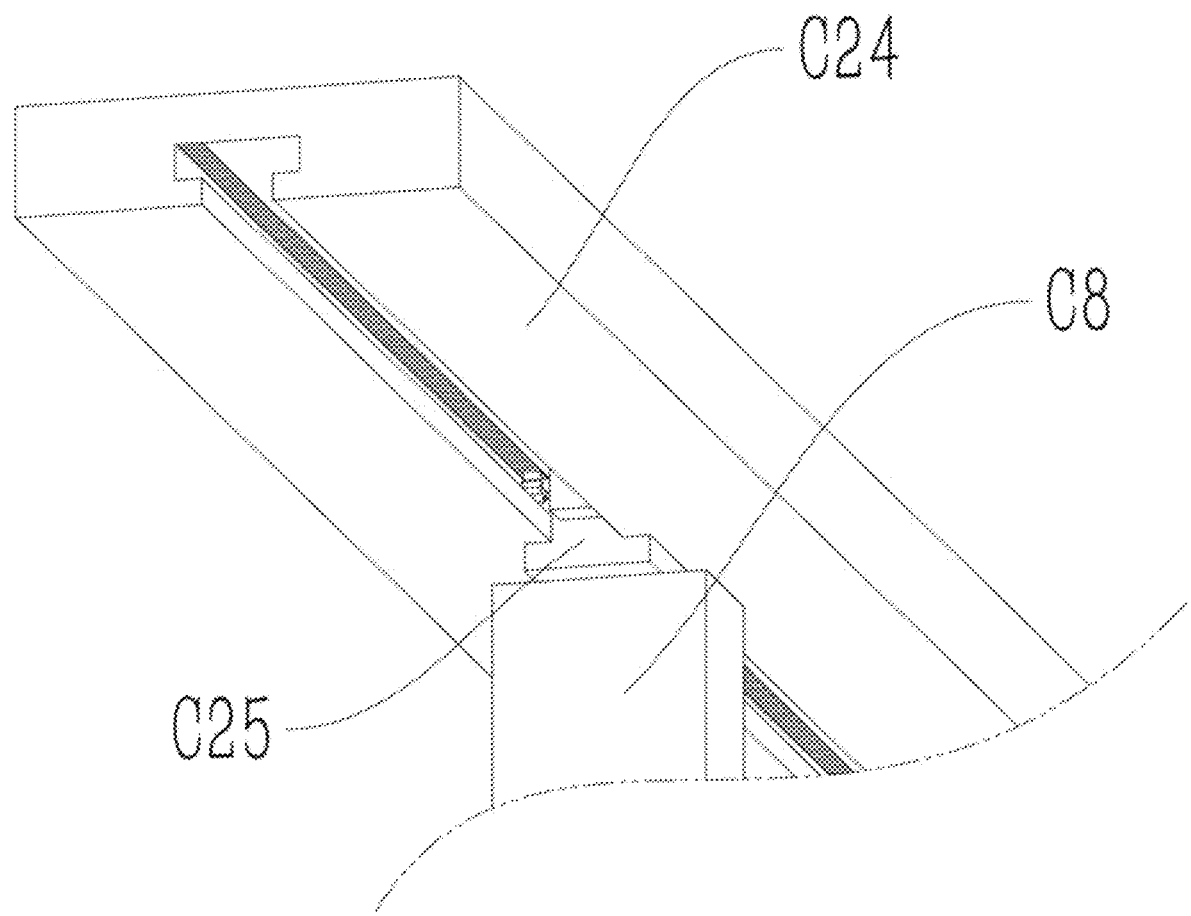
FIG. 14 is a partial structural schematic diagram of a guide rail on a swing oscillation device of a blood sample platelet uniform-mixing device for a blood analyzer in one embodiment of the present application.

On the basis of the technical scheme of the embodiment 5, further, as shown in FIG. 5, FIG. 6 and FIG. 10, each of the second elastic pads B9 is provided with a second spring B11, and one end of the second spring B11 is connected with the side walls of the corresponding one of placing grooves B3.

In this embodiment, the second spring B11 is arranged on each of second elastic pads B9, so that one end of the second spring B11 is connected with the side walls of corresponding one of placing grooves B3, so that after the second elastic pads B9 clamp corresponding one of sample test tubes A4, the corresponding one of second test tubes are capable of being shifted around the part clamped by the second elastic pads B9, which is beneficial to the oscillation of the blood sample in corresponding one of sample test tubes A4 when the vibration units B4 vibrate the sample test tubes A4.

As a preferred embodiment, on the basis of the above mode, further, each of second elastic pads B9 has an arc-shaped structure adapted to the side wall of corresponding one of sample test tubes A4.

Further, each of second elastic pads B9 has the arc-shaped structure. The arc-shaped structure is adapted to the side wall of corresponding one of sample test tubes A4, which facilitates the attachment of the second elastic pads B9 to the side walls of corresponding one of sample test tubes A4, thereby improving the stability of the second elastic pads B9 in clamping corresponding one of sample test tubes A4.

As a preferred embodiment, on the basis of the above mode, further, when one of sample test tubes A4 is placed in corresponding one of placing grooves B3, the second elastic pads B9 are used to clamp different heights of one of sample test tubes A4, and the first spring B5 has different expansion and contraction amounts.

Embodiment 8

As shown in FIG. 11-FIG. 14, the blood sample platelet uniform-mixing device for a blood analyzer provided by this embodiment further includes a swing oscillation device C. The swing oscillation device C includes a gripper body C1 and a control mechanism C2. The gripper body C1 includes a first gripping arm C3 and a second gripping arm C4, and the gripper body C1 is adapted to the control mechanism C2. The first gripping arm C3 and the second gripping arm C4 are used for grasping the sample test tubes A4, and the control mechanism C2 is used for shaking, swinging or rotating one of grasped sample test tubes A4 to disaggregate the aggregated platelets in the sample test tubes A4.

In this embodiment, the first gripping arm C3 and the second gripping arm C4 grip the sample test tubes A4, and the control mechanism C2 shakes or swings or rotates the gripped sample test tubes A4, so that the platelets aggregated in the blood samples in the sample test tubes A4 are capable of being disaggregated, making the possibility of false decrease of the platelet count result is capable of being reduced when the blood is analyzed by the blood analyzer, and improving the accuracy of the platelet count.

As a preferred embodiment, on the basis of the above mode, the control mechanism C2 further includes a first rotating assembly C6. The first rotating assembly C6 is connected with the first gripping arm C3 and the second gripping arm C4. The first rotating assembly C6 is used for controlling the rotation of the first gripping arm C3 and the second gripping arm C4 at the same time, and an axis of rotation of the first gripping arm C3 is staggered with a central point of a connecting line between the first gripping arm C3 and the second gripping arm C4.

Further, after the first gripping arm C3 and the second gripping arm C4 grasp one of sample test tubes A4, the axis of rotation of the first gripping arm C3 is staggered with a central point of a connecting line between the first gripping arm C3 and the second gripping arm C4, so that under the control of the first rotating assembly C6, the first rotating assembly C6 controls one of clamped sample test tubes A4 to shake, and in the actual operation process, the purpose of disaggregation of platelets in the blood sample is achieved through control.

As a preferred embodiment, on the basis of the above mode, further, the control mechanism C2 includes a second rotating assembly C7. The second rotating assembly C7 includes a first movable arm C8 and a second movable arm C9. The first movable arm C8 and the second movable arm C9 are rotatably matched. The second movable arm C9 is connected with the first rotating assembly C6, and a driver C10 is also connected between the first movable arm C8 and the second movable arm C9. The driver C10 is used to control the rotation angle between the first movable arm C8 and the second movable arm C9, so that the rotating shaft driven by the second rotating assembly C7 to rotate the first gripping arm C3 is switched between the horizontal direction and the vertical direction.

Further, the first movable arm C8 and the second movable arm C9 are rotatably matched, and the second movable arm C9 is connected with the first rotating assembly C6, and the rotation angle between the first movable arm C8 and the second movable arm C9 is changed by controlling the driver C10. Specifically, the driver C10 may be a motor. The motor is installed on the first movable arm C8, and the output shaft of the motor is connected with the second movable arm C9. Therefore, that rotating shaft of the first gripping arm C3 is switched between the horizontal direction and the vertical direction, so that after the first gripping arm C3 and the second gripping arm C4 clamp one of sample test tubes A4, when the rotating shaft of the first gripping arm C3 is in the vertical direction, the one of clamped sample test tubes A4 is vertical, and when the first rotating assembly C6 drives the first gripping arm C3 and the second gripping arm C4 to rotate, the sample test tubes A4 rotate jointly, thereby intensifying the activity of blood samples in the sample test tubes A4, and further facilitating the disaggregation of aggregated blood samples.

As a preferred embodiment, on the basis of the above mode, the control mechanism C2 further includes a third rotating assembly C11. The third rotating assembly C11 is arranged on the first gripping arm C3. The third rotating assembly C11 is used for swinging the sample test tubes A4 relative to the first rotating assembly C6.

Further, the control mechanism C2 includes the third rotating assembly C11. The third rotating assembly C11 is arranged on the first gripping arm C3. Under the action of the third rotating assembly C11, one of sample test tubes A4 is capable of swinging relative to the first rotating assembly C6, so that one of sample test tubes A4 is capable of being shaken after the first gripping arm C3 and the second gripping arm C4 clamp one of sample test tubes A4, so that the platelets in the blood sample are capable of being disaggregated, thereby improving the accuracy of platelet count.

Embodiment 9

On the basis of the technical scheme of the embodiment 8, further, as shown in FIG. 11-FIG. 14, the first gripping arm C3 includes a first gripping arm body C12 and a first clamping piece C13. The second gripping arm C4 includes a second gripping arm body C14 and a second clamping piece C15. The first clamping piece C13 and the first gripping arm body C12 and the second clamping piece C15 and the second gripping arm body C14 are both rotatably connected. And the first gripping arm body C12 and the first clamping piece C13 are also connected through the third rotating assembly C11, and the third rotating assembly C11 is used for adjusting the rotation angle of the first clamping piece C13 relative to the first gripping arm body C12.

Further, the first gripping arm C3 includes the first gripping arm body C12 and the first clamping piece C13, and the second gripping arm C4 includes the second gripping arm body C14 and the second clamping piece C15. At the same time, both the first clamping piece C13 and the first gripping arm body C12 and the second clamping piece C15 and the second gripping arm body C14 are both rotatably connected, so that after the first clamping piece C13 and the second clamping piece C15 clamp one of sample test tubes A4, one of sample test tubes A4 is capable of moving relative to the first gripping arm body C12 and the second gripping arm body C14. Further, the third rotating assembly C11 connects the first gripping arm body C12 and the first clamping piece C13, so that the third rotating assembly C11 is capable of adjusting the rotation angle of the first clamping piece C13 relative to the first gripping arm body C12. Under the action of the third rotating assembly C11, on the one hand, the swinging amplitude and the swinging frequency of one of sample test tubes A4 are capable of being controlled; on the other hand, it is convenient to fix one of sample test tubes A4 horizontally or vertically, and it is convenient to rotate one of sample test tubes A4 to achieve the purpose of oscillation under the cooperative action of the first rotating assembly and the second rotating assembly, so that the swing oscillation device C provides various ways of disaggregating platelets.

As a preferred embodiment, on the basis of the above mode, the third rotating assembly C11 further includes a third motor C16 and an end face gear C17. The third motor C16 is arranged on the first gripping arm body C12 and the end face gear C17 is arranged on the first clamping piece C13, and the output shaft of the third motor C16 is provided with a third gear C18, and the third gear C18 is meshed with the end face gear C17.

Further, the third rotating assembly C11 includes the third motor C16 and the end face gear C17. The output shaft of the third motor C16 is provided with the third gear C18, while the end face gear C17 is provided on the first clamping piece C13, and the third gear C18 is meshed with the end face gear C17. By controlling the rotation of the third motor C16, the output shaft of the third motor C16 drives the third gear C18 and the end face gear C17 to rotate, thereby controlling the rotation angle of the first clamping piece C13 relative to the first gripping arm body C12 for facilitating the third motor 16 to drive the sample test tubes A4 to swing.

As a preferred embodiment, on the basis of the above mode, the first rotating assembly C6 further includes the first motor C19 and the first rotating disc C20. The first motor C19 is fixed with the second movable arm C9, the output shaft of the first motor C19 is connected with the first rotating disc C20, and the first gripping arm C3 and the second gripping arm C4 are arranged on the first rotating disc C20.

Further, by fixing the first motor C19 with the second movable arm C9, and connecting the output shaft of the first motor C19 with the first rotating disc C20, and arranging the first gripping arm C3 and the second gripping arm C4 on the first rotating disc C20, when the first motor C19 is driven to rotate, the output shaft of the first motor C19 drives the first rotating disc C20 to rotate, which is convenient for the first gripping arm C3 and the second gripping arm C4 to clamp the sample test tubes A4 to rotate jointly, thus oscillating the blood samples in the sample test tubes A4.

As a preferred embodiment, on the basis of the above mode, further, the first rotating disc C20 is provided with a chute C21, the first gripping arm C3 is clamped in the chute C21, and the first rotating disc C20 is also provided with a first telescopic rod C22. One end of first telescopic rod C22 is connected with the first gripping arm C3, and the other end of first telescopic rod C22 is connected with the first rotating disc C20. The first telescopic rod C22 extends and retracts to make the first gripping arm C3 move along the chute C21, so that the first gripping arm C3 and the second gripping arm C4 cooperate to clamp the sample test tubes A4.

Further, by arranging the chute C21 on the first rotating disc C20, the first gripping arm C3 is clamped in the chute C21, and the moving direction of the first gripping arm C3 is further limited. By arranging the first telescopic rod C22 on the first rotating disc C20, one end of first telescopic rod C22 is connected with the first gripping arm C3, and the other end of first telescopic rod C22 is connected with the first rotating disc C20. By expanding and contracting the first telescopic rod C22, the first telescopic rod C22 drives the first gripping arm C3 to move along the chute C21, and then the distance between the first gripping arm C3 and the second gripping arm C4 is adjusted, so that the purpose of clamping the sample test tubes A4 by the cooperation of the first gripping arm C3 and the second gripping arm C4 is realized, and the convenience and stability of clamping the sample test tubes A4 are improved.

Embodiment 10

On the basis of the technical scheme of embodiment 9, further, as shown in FIG. 11 to FIG. 14, the first clamping piece C13 and the second clamping piece C15 are both provided with a third elastic pad C23. The third elastic pad C23 is elastic. When the first gripping arm C3 and the second gripping arm C4 clamp the sample test tubes A4, the third elastic pad C23 is located at the side facing the sample test tubes A4.

Further, the first clamping piece C13 and the second clamping piece C15 are both provided with the third elastic pad C23 with elasticity, and the third elastic pad C23 is located at the side facing the sample test tube A4. Therefore, when the first clamping piece C13 and the second clamping piece C15 clamp the one of sample test tubes A4, the third elastic pad C23 contacts the sample test tubes A4 and the third elastic pad C23 is pressed, so that the clamping stability of the sample test tubes A4 is capable of being improved.

As a preferred embodiment, on the basis of the above mode, the swing oscillation device C for the blood analyzer further includes a guide rail C24. A slider C25 which is matched with the guide rail C24 is arranged on the first movable arm C8. The guide rail C24 and the slider C25 are driven by a rack and pinion, and the guide rail C24 is fixed on the blood analyzer.

Further, the swing oscillation device C also includes the guide rail C24, and the slider C25 which is adapted to the guide rail C24 is also arranged on the first movable arm C8. The guide rail C24 and the slider C25 are driven by the rack and pinion, and the guide rail C24 is fixed on the blood analyzer. A motor may be installed on the slider C25, so that the output shaft of the motor is connected with the gear in the rack and pinion drive. When the motor is driven, it is convenient to drive the slider C25 on the guide rail C24 to move and further adjust the position of the swing oscillation device C on the blood analyzer, so that the swing oscillation device C can oscillate the sample test tube A4 after grasping the sample test tube A4, and it is convenient to oscillate the sample test tubes A4 after the swing oscillation device C grasps the sample test tubes A4 and to reset the sample test tubes A4 after the oscillation of the sample test tubes A4 is completed.

In this application, the vortex oscillation device A, the test tube bracket B and the swing oscillation device C are arranged, which are used in combination with each other, so that the oscillating effect and the convenience of the blood samples in the sample test tubes A4 are capable of being further improved. Specifically, before the blood samples are detected, the blood samples are pre-oscillated by the vortex oscillation device A of this application, and then a plurality of sample test tubes A4 after pre-oscillation are placed on the test tube bracket B, and then the sample injector is used for determination. Because it takes certain preparation time to place a plurality of sample test tubes A4 on the test tube bracket B, the probability and rate of platelet aggregation in the blood samples in the preparation stage are capable of being greatly reduced by setting the pre-oscillation stage. During the determination process, when the test tube bracket B oscillates the blood samples in the sample test tubes A4, the oscillation time is capable of being shortened and the oscillation effect is capable of being improved, so that the determination speed and efficiency are capable of being improved. In addition, the swing oscillation device C plays the role of transporting the sample test tubes A4 on the basis of shaking, oscillating or rotating the sample test tubes A4, that is, transporting the sample test tubes A4 to the vortex oscillation device A or the test tube bracket B. In this way, the blood samples in the sample test tubes A4 are capable of being oscillated in the process of transporting the sample test tubes A4, which is capable of further facilitating the disaggregation of platelets and reducing the probability and rate of platelet re-aggregation, thus further improving the detection accuracy.

The above embodiments are only used to illustrate the application without limiting the technical schemes described by the application. Although this specification has described the application in detail with reference to the above embodiments, the application is not limited to the above specific embodiments, so any modification or equivalent substitution made to the application and all technical solutions and improvements that do not depart from the spirit and scope of the application are covered by the scope of the claims of the application.

What is claimed is:

1. A blood sample platelet uniform-mixing device for a blood analyzer, comprising a vortex oscillation device, wherein the vortex oscillation device comprises a fixing assembly, a rotating assembly and a vibrating assembly, the fixing assembly is used for fixing a corresponding one of sample test tubes, the rotating assembly comprises a rotating motor and a rotating disc, a rotating shaft of the rotating motor is connected with the rotating disc, a central axis of the corresponding one of the sample test tubes fixed on the fixing assembly deviates from the rotating shaft of the rotating motor, the rotating assembly is used for rotating the fixing assembly and making a blood sample in the corresponding one of the sample test tubes be in a vortex shape, the vibrating assembly is arranged on the fixing assembly, the vibrating assembly is used for vibrating the corresponding one of the sample test tubes after the blood sample is in the vortex shape;

the rotating disc is provided with an adapter, wherein the adapter is fixedly connected with the fixing assembly, the adapter is rotatably connected with the rotating disc, annular teeth are circumferentially distributed on an outer side of the adapter, the rotating assembly also comprises a gear ring, the gear ring is fixed with the rotating motor, and an inner ring of the gear ring is meshed with the annular teeth; and an end part of the adapter connected with the fixing assembly is an elastic part, and the elastic part is elastic, when the rotating motor drives the corresponding one of the sample test tubes to rotate, the elastic part is capable of generating deformation to tilt the corresponding one of the sample test tubes.

2. The blood sample platelet uniform-mixing device for the blood analyzer according to claim 1, wherein the fixing assembly comprises an upper cover and a lower cover, the upper cover is fixed with the adapter, the upper cover is connected with the lower cover, and the upper cover and the lower cover are used for clamping the corresponding one of the sample test tubes along a length direction of the corresponding one of the sample test tubes.

3. The blood sample platelet uniform-mixing device for the blood analyzer according to claim 2, wherein the upper cover and the lower cover are connected through a telescopic rod, the telescopic rod is an electric telescopic rod or a pneumatic telescopic rod, and the telescopic rod is located at a side edge of the lower cover.

4. The blood sample platelet uniform-mixing device for the blood analyzer according to claim 3, wherein the vibrating assembly comprises a vibrator, the vibrator is arranged on the lower cover, the vibrator is capable of driving the corresponding one of the sample test tubes on the lower cover to vibrate jointly, the upper cover and the lower cover are both cylindrical structures with one end sealed, and each of the sample test tubes is adapted to the cylindrical structures of the upper cover and the lower cover.

5. The blood sample platelet uniform-mixing device for the blood analyzer according to claim 4, wherein the lower cover comprises a lower cover body and a lower cover plate, the lower cover body is in a cylindrical structure with one end sealed, the lower cover plate is in a plate shape, the lower cover plate is positioned below the lower cover body, the lower cover body and the lower cover plate are connected through a spring, the spring is elastic, the vibrator is arranged on the lower cover body, the lower cover plate is connected with the telescopic rod; and an inner side wall of the upper cover is provided with an elastic pad, the elastic pad is elastic, and the elastic pad cooperates with the upper cover to clamp a side wall of each of the sample test tubes.

6. A blood sample platelet uniform-mixing system for the blood analyzer, comprising the vortex oscillation device according to claim 1 and a test tube bracket, wherein the vortex oscillation device is configured to pre-oscillate the sample test tubes, the test tube bracket is configured to place the sample test tubes after being pre-oscillated, the test tube bracket comprises a bracket body, the bracket body is provided with a plurality of placing grooves for placing the sample test tubes, vibration units adapted to the placing grooves is arranged in the bracket body, and the vibration units are used for driving the sample test tubes placed in the placing grooves to vibrate jointly;

an outer diameter of each of the sample test tubes is smaller than an inner diameter of each of the placing grooves, and each of the vibration units is arranged at a bottom of corresponding one of the placing grooves;

a first spring is connected below each of the vibration units, and the first spring is connected with the bottom of each of the placing grooves;

a tray is connected above each of the vibration units, the tray is used to contact with a bottom of each of the sample test tubes, and a baffle is arranged on the tray, the baffle is arranged around the tray, when one of the sample test tubes is placed in corresponding one of the placing grooves, there is a gap between the one of the sample test tubes and the baffle; when the vibration units drive the sample test tubes to vibrate, the baffle collides with a side wall of the one of the sample test tubes;

each of the placing grooves is also provided with at least two second elastic pads, the second elastic pads are located in an upper area in each of placing grooves, the second elastic pads are elastic, and the at least two second elastic pads are used for clamping corresponding one of the sample test tubes; and when the one of the sample test tubes is placed in corresponding one of the placing grooves, the second elastic pads are used for clamping different height parts of the one of the sample test tubes and the first spring has different expansion and contraction amounts.

7. A blood sample platelet uniform-mixing system for the blood analyzer, comprising the vortex oscillation device according to claim 1 and a swing oscillation device, wherein the swing oscillation device is configured to transport the sample test tubes, the swing oscillation device comprises a gripper body and a control mechanism, the gripper body comprises a first gripping arm and a second gripping arm, and the first gripping arm and the second gripping arm are used for clamping sample test tubes, and the control mechanism is used for swinging clamped one of the sample test tubes, so as to disaggregate aggregated platelets in the sample test tubes;

the control mechanism comprises a first rotating assembly, the first rotating assembly is connected with the first gripping arm and the second gripping arm, the first rotating assembly is used for simultaneously controlling the first gripping arm and the second gripping arm to rotate, and an axis of rotation of the first gripping arm is staggered with a central point of a connecting line between the first gripping arm and the second gripping arm; and the control mechanism comprises a second rotating assembly, the second rotating assembly comprises a first movable arm and a second movable arm, the first movable arm and the second movable arm are rotatably matched, the second movable arm is connected with the first rotating assembly, and a driver is also connected between the first movable arm and the second movable arm, and the driver is used for controlling a rotation angle between the first movable arm and the second movable arm, so a rotating shaft driven by the second rotating assembly to rotate the first gripping arm is switched between a horizontal direction and a vertical direction.

8. The blood sample platelet uniform-mixing system for the blood analyzer according to claim 7, wherein the control mechanism comprises a third rotating assembly, the third rotating assembly is arranged on the first gripping arm, the third rotating assembly is used for swinging the one of the sample test tubes relative to the first rotating assembly;

the first gripping arm comprises a first gripping arm body and a first clamping piece, and the second gripping arm comprises a second gripping arm body and a second clamping piece, the first clamping piece and the first gripping arm body, and the second clamping piece and the second gripping arm body are both rotatably connected, the first gripping arm body and the first clamping piece are also connected through the third rotating assembly, and the third rotating assembly is used for adjusting a rotation angle of the first clamping piece relative to the first gripping arm body;

the third rotating assembly comprises a third motor and an end face gear, the third motor is arranged on the first gripping arm body, the end face gear is arranged on the first clamping piece, and an output shaft of the third motor is provided with a third gear, the third gear is meshed with the end face gear;

the first rotating assembly comprises a first motor and a rotating disc, the first motor is fixed with the second movable arm; an output shaft of the first motor is connected with the rotating disc, and the first gripping arm and the second gripping arm are arranged on the rotating disc; and the rotating disc is provided with a chute, the first gripping arm is clamped in the chute, and the rotating disc is also provided with a telescopic rod; one end of the telescopic rod is connected with the first gripping arm, and an other end of the telescopic rod is connected with the rotating disc; and the telescopic rod is telescopic to enable the first gripping arm to move along the chute, so the first gripping arm and the second gripping arm are matched to clamp the one of the sample test tubes.

\* \* \* \* \*